Sept. 22, 1959　　　M. ZAJAC ET AL　　　2,905,015
LEAD SCREW UNIT

Filed Nov. 20, 1956　　　　　　　　　　2 Sheets-Sheet 1

INVENTOR.
MICHAEL ZAJAC
JULIAN WISNICKI
BY
　　　ATTORNEYS

Sept. 22, 1959 — M. ZAJAC ET AL — 2,905,015
LEAD SCREW UNIT
Filed Nov. 20, 1956 — 2 Sheets-Sheet 2
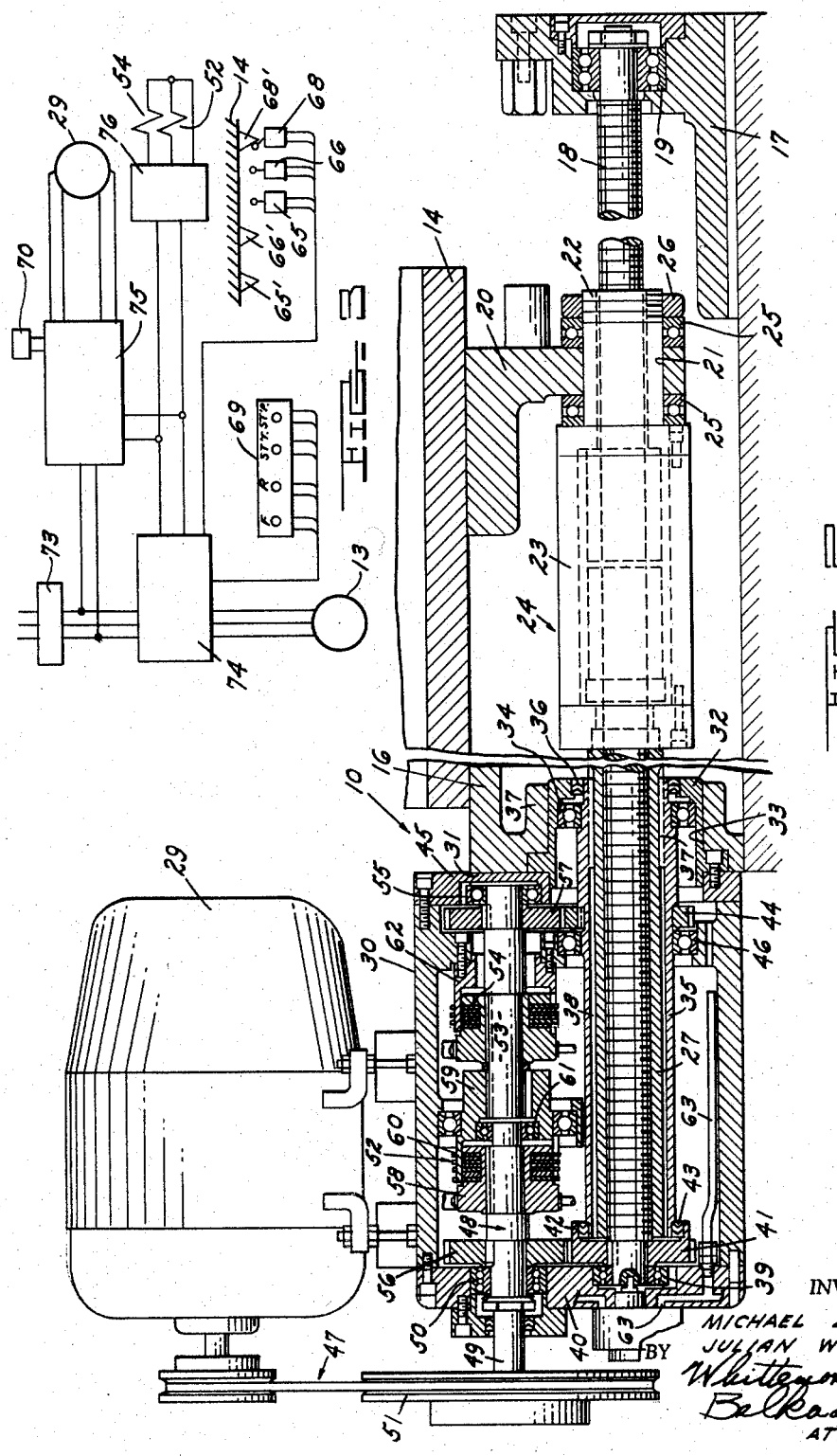
INVENTOR.
MICHAEL ZAJAC
JULIAN WISNICKI
BY Whitemore, Hulbert &
Belknap
ATTORNEYS

United States Patent Office 2,905,015
Patented Sept. 22, 1959

2,905,015

LEAD SCREW UNIT

Michael Zajac, Detroit, and Julian Wisnicki, Allen Park, Mich., assignors to Buhr Machine Tool Company, Ann Arbor, Mich., a corporation of Michigan Application November 20, 1956, Serial No. 623,466

6 Claims. (Cl. 74—472)

The present invention relates to traverse equipment for controlling the advancing and retracting movements of a machine tool in relation to work to be machined. Though of general application to control the feed of a machine tool spindle or the like, the invention has particular utility in connection with up to date transfer equipment by which a work piece is successively presented to multiple, in-line stations at which various types of machining operations are performed.

More particularly, the invention relates to a mechanical lead screw unit for the purpose described, which unit is a package type unit of compact and relatively inexpensive construction. It is very well adapted to be employed to convert an existing tool having hydraulic feed provisions for mechanical operation and automatic electrical control. It will also be appreciated as the description proceeds that the unit of the invention may well have application in other settings than as an adjunct of a machine tool feed and retract installation.

In equipment of the type referred to it is desirable that the machine tool be advanced from a cleared or retracted position, in relation to the work to be operated on, in an initial feed stroke phase of relatively high lineal or axial speed into proximity to the work, then advanced at a relatively slower speed as the machining proceeds, then retracted a full reverse stroke at a relatively high speed. It is also desirable that the speeds in question be variable, each in its own phase.

However, the feed apparatus presently available to the art, whether mechanically or hydraulically powered as to the feed and retract strokes, is severely limited in regard to the tool travel speeds which are possible, usually being restricted to a few arbitrary lineal speeds, with zero gradation from one to the next. Typical is the type of equipment in which gear sets must be changed in order to effect the desired speed alteration.

It is therefore an object of the invention to provide equipment of the type referred to for advancing and retracting a machine tool or like device at different speeds in different phases of the advancing and/or retracting cycle, in which the change of advance speed is effected automatically, and in which the respective speeds in either cycle are variable in infinitely small speed increments over a relatively wide range, of the order of a 100:1 ratio.

More specifically, it is an object to provide equipment of the type described in the form of a lead screw unit comprising axially telescoped, rotatable shafts operatively connected to one another by a threaded connection whereby a desired speed change in shifting from one cycle phase to another may be effected by a relative rotation of the two shafts for a differential in rotative speed.

Another object is to provide a unit or equipment as described in the preceding paragraph, in which infinitely small speed variations in the operation of the shafts referred to is accomplished by driving the same from a direct current motor having a non-stepped, smooth speed regulation of great flexibility over a wide speed ratio range. In the unit chosen for the purpose of illustration the ratio is 100:1.

Yet another object is to provide a lead screw unit as described which is in the form of a highly compact package, simple and inexpensive, yet extremely rugged and reliable in the operation of its component parts, which package may be bolted to the machine tool slide base of standard machine tool equipment, for example an existing type of hydraulically powered machine tool, with very little alteration in its structure.

The foregoing as well as other objects will be made more apparent as this description proceeds, especially when considered in connection with the accompanying drawings, wherein:

Fig. 2 is a fragmentary view in vertical axial section through the unit as applied to the base of the machine tool, such as a horizontal bore; and Fig. 3 is a schematic wiring diagram showing the control of the feed and advance cycles in a general way.

Figure 1:
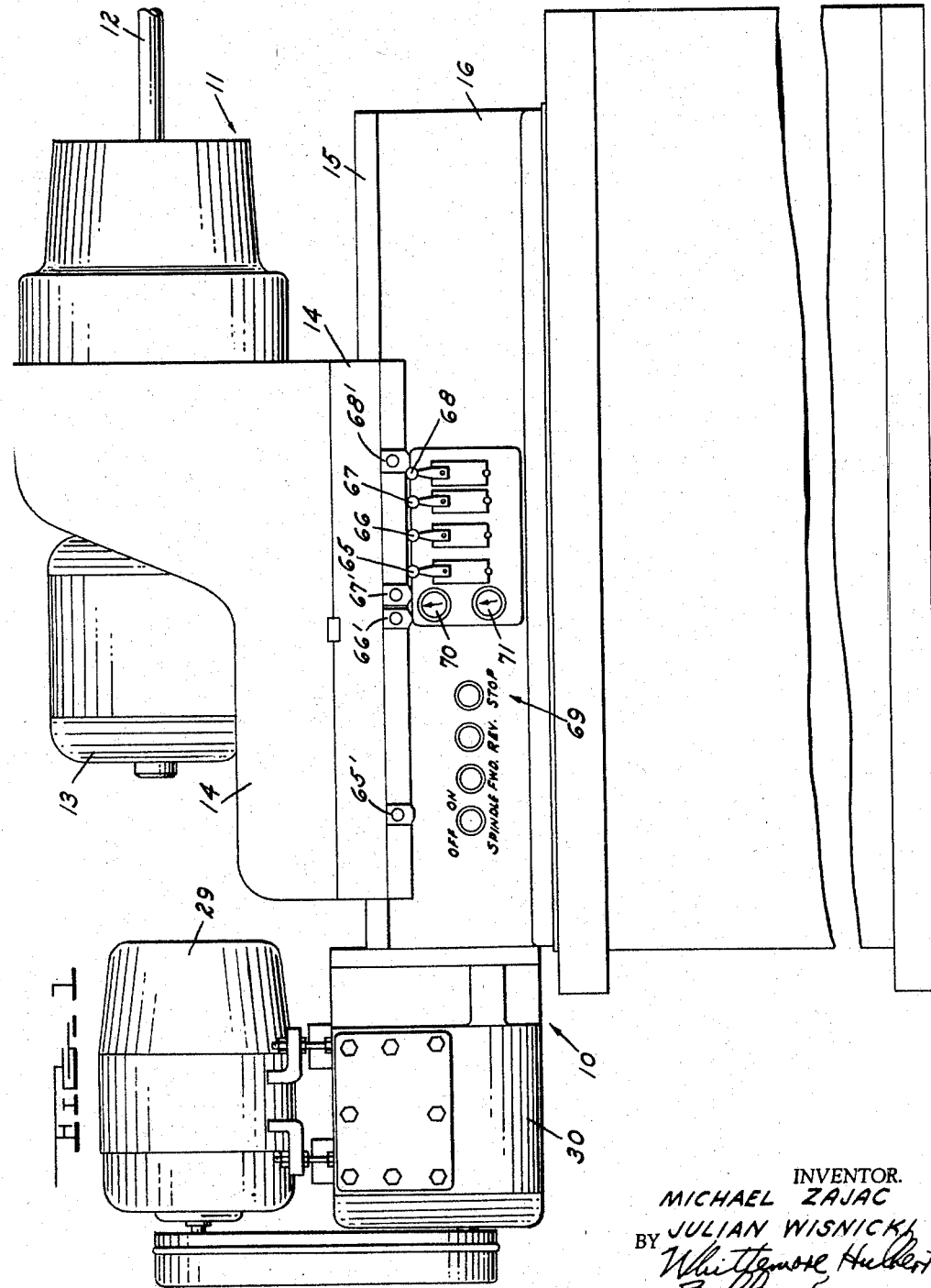
Fig. 1 is a fragmentary view in side elevation of a machine tool equipped with the package-type lead screw unit of the invention.

The reference numeral 10 generally designates the improved lead screw unit, as applied to a conventional type of machine tool, generally designated 11, such as a horizontal bore. The spindle 12 of this bore is powered appropriately and in a conventional manner by an electric motor 13 mounted on its slide 14, which travels in the usual fashion on a way or ways 15 of the machine tool base 16.

As indicated in Fig. 2 of the drawings, the base 16 is provided with an end bearing mount 17, in which a first or screw shaft 18 is rotatably mounted by a ball bearing 19. The slide 14 is equipped with a downwardly projecting actuator member 20, in fixed relation to the slide, and this actuator is apertured at 21 to rotatively receive a reduced cylindrical end extension 22 of the housing 23 of an anti-friction ball bearing circulating nut, generally designated 24. The actuator 20 is coupled to the nut 24 for axial movement therewith by means of a pair of end thrust ball bearings 25, one on either side of the actuator. It is thus evident that the actuator 20 and the machine tool slide 14 will partake of axial movement with the circulating nut 24 whether the same is rotatively fixed or is rotating. A retainer nut 26 holds the bearings 25 in the relationship described.

The housing 23 of the conventional nut 24 is fixedly secured at its end opposite the end thrust bearings 25 to a second shaft 27 of the lead screw unit 10, which is in the form of a tubular sleeve axially housing the first or screw shaft 18, and slidable axially along the latter.

The circulating nut housing 23 is threadedly engaged with screw shaft 18 internally of the nut, in a well-known manner not requiring illustration or description in detail. Hence it is evident that when second shaft or sleeve 27 is restrained from rotation the nut housing 23 will be similarly restrained, and that rotation of the first or screw shaft 18 will occasion an axial movement of the slide 14 in one direction or the other, depending upon the direction of rotation of shaft 18. It is equally evident that when the sleeve 27 is rotated along with the shaft 18, but at a different rotative speed, the slide 14 will be advanced at a slower or greater axial speed than before, depending upon the amount of the rotative speed differential. As adapted to the purposes of the present invention, the speed of sleeve 27, in the slow feed stage or phase of the operation, is less than that of the shaft 18, for example in the ratio of 740 r.p.m. to 818 r.p.m., so that axial speed of the slide 14 in this working or machining phase is greatly reduced below that of the initial in-fed phase in which the second shaft or sleeve 27 is held rotatively fixed by the provisions presently to be described.

The prime mover for the unit is a direct current motor 29 of, say, ¾ hp. rating supplied by a rectified input from a motor generator or like electrical power source and controlled as to speed over a wide range of, for example, 23 r.p.m. to 2,300 r.p.m. by a potentiometer or rheostat arrangement, as will be generally described. Motor 29 is rigidly bolted on the top of a transmission and bearing housing 30 of the unit 10, and this housing is in turn bolted to a rear end face 31 of the machine tool slide base 16, in a way to make possible a simple and inexpensive change-over from a hydraulic feed to the lead screw operation according to the invention.

For this purpose a bearing adapter or mount 32 is fitted in an end bore 33 of the base 16 adjacent the face 31, in rigidly secured relation to the latter. Mount 32 is an annular one and in turn receives a ball bearing 34 whose inner race is carried on a tubular transmission shaft 35 which encircles the second tubular shaft or sleeve 27 of the screw unit, being in radially spaced concentric relation to that sleeve. Adjacent the bearing 34 a seal 36 is applied between the transmission shaft 35 and bearing mount 32 to seal the structure while permitting some possible tilt of the sleeve. Radially inwardly of the bearing 34 the tubular transmission shaft is provided with axial splines 37 which are received in elongated external spline grooves 38 machined in the second or tubular shaft member 27, so that the two tubular members 27 and 35 are coupled for rotation while permitting the thread actuated second shaft or sleeve to shift axially, whether the tubular transmission shaft 35 is rotating or not.

At its lefthand end, as viewed in Fig. 2, the central screw shaft 18 is piloted by ball bearing 39 in an end wall 40 of the housing 30. Inwardly of the bearing 39 the shaft 18 has a gear 41 keyed thereto, and the gear 41 has an annular, inwardly extending flange 42, into which the adjacent end of the tubular transmission shaft 35 extends, being rotatively sustained in this zone in an appropriate annular seal 43.

Tubular transmission shaft 35 has a gear 44 keyed thereto adjacent and inwardly of an opposite, apertured end wall 45 of the housing 30, and a ball bearing 46 inwardly of this gear serves to rotatively support transmission shaft 35, assisting the bearing 34 in this end.

The direct current motor 29 is drivingly connected, with a desired constant reduction in rotative speed, through a belt and pulley connection, generally designated 47, with second transmission shafting 48 paralleling the first tubular transmission shaft 35 within the housing 30.

Transmission shafting 48 is compound in nature. It includes a rear shaft portion 49 journaled by a ball bearing 50 in the housing end wall 40, to which shaft portion motor power is applied through a large pulley 51; an electric clutch unit 52 connected to shaft portion 49; and a further forward shaft portion 53 controlled by an electric brake unit 54. The shaft portion 53 is journaled in the forward end wall 45 of the housing by a ball bearing 55.

A gear 56 is keyed on shaft portion 49 inwardly of end wall 40 and is in mesh with the screw shaft gear 41; and a gear 57 is keyed on the second shaft portion 53 inwardly of end wall 45, and is in mesh with the secondary tubular transmission shaft 35.

The clutch 52 is of an entirely conventional disk type electrically energized under the controls to be described. It has a driving member 58 keyed on the portion 49 of shafting 48, a driven member 59 keyed on the other portion 53 of the shafting and friction disks 60 splined to the respective driving and driven clutch member 58, 59 in the well-known manner. Driven member 59 mounts a ball bearing 61 to pilot the forward end of transmission shaft portion 49.

The brake 54 is also entirely conventional in character, being a disk type similar in structure to the clutch 52. It is anchored by an annular member 62 bolted to the internal housing structure; and the showing of the brake 54, as well as of the clutch 52, is highly conventionalized. They are energized and deenergized coordinately, the clutch being released and the brake applied simultaneously, and vice versa, as will be described.

It is evident that, with clutch 52 released and brake 54 applied, the driving connection from motor 49 through shafting 48 is broken and the transmission shaft gear 57 is locked, to similarly lock the secondary tubular transmission shaft 35 through its mesh with gear 44 on that shaft. When the clutch 52 is engaged and brake 54 released, the tubular transmission shaft 35 is driven through shafting 48 and meshing gears 57 and 44, so as to rotate the ball bearing circulating nut unit 24 and create a speed differential between the screw shaft 18 and the nut housing 23. Depending upon the character of the differential, the speed of axial traverse of the slide 14 will be lessened or increased, as will be evident.

Appropriate piping and conduit provisions 63 are employed to lubricate properly the rotative parts within the housing 30. These provisions constitute no part of the invention.

Referring to Fig. 1 of the drawings, in conjunction with Fig. 3, the motions of the slide 14 are controlled by a series of limit switches mounted on the side of the machine tool base 16. The switches are four in number, being designated 65, 66, 67 and 68; and switch actuator tappets or lugs for the same, bolted on the side of slide 14 in appropriate axial spacing, are respectively designated by corresponding reference numerals, primed.

The limit switch 65 is a depth switch which controls an appropriate timer to determine the dwell of the machine tool after it has completed its forward working stroke or traverse, and then reverses the motor 29 to reverse the travel of the slide 14. The limit switch 66 has the function of initially altering the speed of traverse (ordinarily by dropping it through the different speed action on the screw shaft 18, but possibly by increased traverse speed in some installations).

The limit switch 67 is a further speed regulating switch which may be employed in the event it is desired to effect a still further change in speed in the traverse of machine tool slide 14 as when two different working cuts are successively in order on the same stroke cycle. The final limit switch 68 is operated on the reverse traverse of the slide 14, and signals a "clear" condition, with the machine tool withdrawn from the work, whereupon an ensuing work transfer operation automatically occurs.

Appropriate manual control switch buttons are incorporated in the electrical wiring, being designated generally by the reference numeral 69. Their functions are indicated in Fig. 1. Likewise, suitable rheostat or potentiometer controls 70, 71 are mounted on the machine tool base for regulating master speeds of traverse, in the event it is desired to make an overall alteration of machine tool traverse speed, over and above the individual alterations accomplished through the screw shaft provisions.

It is seen by inspection of Figs. 1 and 2 that the improved unit 10 may be easily and quickly applied to an existing machine tool base 16 by bolting to its rear end face 31. Similarly, the unit may be bodily removed for inspection, repair or replacement, if required, and a similar unit substituted without putting the tool down for an appreciable length of time.

Fig. 3 is a highly conventionalized layout showing the use of standard, purchased components for the control of the traverse of slide 14. In this view only the most basic components are illustrated, it being noted that the second speed control limit switch 67 is eliminated and that the clutch 52 and brake 54 are denoted simply by a coil component. Similarly, only a single rheostat or potentiometer control 70 is indicated in block outline.

A master switch 73 controls the supply of 440 volt, three-phase 60 cycle electrical energy to a conventional alternating current control 74, and a commercial variable speed D.C. motor control 75 receives and rectifies two phases of this current. Potentiometer 70 permits variation of the speed of D.C. motor 29 through control 75 over the wide range mentioned above, in infinite increments.

The reference numeral 76 generally designates a conventional electric brake and clutch control unit which governs the energization and the de-energization of clutch 52 and brake 54, as described above.

In operation, assuming that the slide 14 is in a fully retracted position as shown in Figs. 1 and 2, the clutch 52 is released decoupling the shaft portions 49 and 53 of shafting 48; and brake 54 is fully applied. Tubular transmission shaft 35 is locked against rotation, and the direct current motor 29 drives screw shaft 18 rotatably at a desired basic speed determined by the control 75. The drive of the screw shaft is direct through the meshing gears 56, 41, which have the same number of teeth. A desired motor speed reduction is accomplished through belt and pulley connection 47. The slide 14 advances until the limit switch tappet 66' engages and closes limit switch 66. In this connection it will be appreciated that the switches 65, 66, 67, 68 and their corresponding tappets are in laterally stepped or staggered relation to avoid interference.

Upon engagement of the lug 66' with switch 66 at the end of the full speed slide stroke as driven by screw shaft 18 and the rotatively restrained sleeve shaft and nut unit 24, circuits are completed as shown in Fig. 3, which energize the electric clutch unit 52 to engage its disks 60 and de-energize the brake unit 54. This permits rotation of gear 57 and drive of transmission shaft gear 44. Sleeve shaft 35 is thus rotated at a speed determined by the setting of the potentiometer or rheostat means 70, 71. The ensuing rotation of the ball nut unit 24 and conesquent speed differential slow the screw shaft 18 and the axial advance of slide 14.

If another speed change on the working stroke of the machine tool is desired, it may be taken care of by the engagement of the tappet 67' with the switch 67 to thus set up a different circuit further changing the speed of shaft 18. Circuit arrangements for accomplishing this will suggest themselves to those skilled in the art.

Upon completion of the working stroke, the tappet 65' engages switch 65 to de-energize the motor 29 and, following a predetermined timed dwell, to reverse the motor. Slide 14 now traverses rearwardly to a fully withdrawn and cleared position, at which time the tappet 68' engages switch 68 to de-energize the motor. At this time the clutch and brake circuits may be restored to their original condition, i.e. with the clutch decoupling the shafting 48 and the brake 54 holding sleeve shaft 35 and the ball nut unit 24 from rotation.

A machine tool feed unit is provided which is very compact and relatively inexpensively produced, yet very rugged and reliable. Its speed range is a wide one, and speeds are smoothly effected over the entire range in infinitely small increments.

What we claim as our invention is:

1. A lead screw unit for application to a machine tool or the like to advance a platen or like movable operating member along a fixed base thereof, said unit comprising a first rotatable and axially fixed shaft, a second rotatable and axially movable shaft concentric with and threadedly connected to said first shaft, means to operatively connect said operating member with said second shaft for movement of said member at a rate determined by the rotative speed differential of said shafts, and means to selectively control the rotation of said shafts, comprising an electric motor having means to regulate the same as to speed over a wide and substantially stepless range, a driving connection from said motor to one of said shafts, transmission shafting drivingly connected to the other shaft, a releasable clutch connecting said motor and said transmission shafting, a brake applicable to retard rotation of said other shaft upon release of said clutch, means to simultaneously release said clutch and apply said brake, and vice versa, and directional speed control means for said motor including an element having means to mount the same for movement with said operating member, said element being positioned for engagement in said movement with an element fixed relative to said base to cause said control means to operate.

2. A lead screw unit in accordance with claim 1, in which said last named means includes limit switch means progressively actuated in the axial movement of said operating member.

3. A lead screw unit for application to a machine tool or the like to advance a platen or like movable operating member thereof, said unit comprising a first rotatable and axially fixed shaft, a second rotatable and axially movable shaft concentric with and threadedly connected to said first shaft, means to operatively connect said operating member with said second shaft for movement of said member at a rate determined by the rotative speed differential of said shafts, and means to selectively control the rotation of said shafts, comprising means including a motor to rotate one of said shafts, transmission shafting drivingly connected to the other shaft, a releasable clutch connecting said shaft rotating means and said transmission shafting, and a brake applicable to retard rotation of said other shaft upon release of said clutch, and directional speed control means for said motor including an element having means to mount the same for movement with said operating member, said element being positioned for engagement in said movement with an element fixed relative to said base to cause said control means to operate.

4. A lead screw unit for application to a machine tool or the like having a fixed base on which an operating member moves axially, said unit comprising a housing having adapter means to secure the same fixedly to an axial end of said base, said housing internally journaling shaft means including relatively rotatable shafts in coaxially threaded engagement with one another, said shafts extending externally of said housing and being provided with means to operatively connect the externally extending portion of one thereof to said operating member and to journal the other thereof on said base, whereby to cause axial movement of said operating member on said base upon relative threading rotation of said shafts, a motor, variable speed drive means within said housing driven by said motor and drivingly connected to said shafts to govern the rate of relative rotation of said shafts, and directional speed control means for said motor including an element having means to mount the same for movement with said operating member, said element being positioned for engagement in said movement with an element fixed relative to said base to cause said control means to operate.

5. A lead screw unit for application to a machine tool or the like having a fixed base on which an operating member moves axially, said unit comprising a housing having adapter means to secure the same fixedly to an axial end of said base, said housing internally journaling shaft means including relatively rotatable shafts in coaxially threaded engagement with one another, said shafts extending externally of said housing and being provided with means to operatively connect the externally extending portion of one thereof to said operating member and to journal the other thereof on said base, whereby to cause axial movement of said operating member on said base upon relative threading rotation of said shafts, a common electric motor to drive said shafts, variable speed drive means within said housing connecting said device with said shafts and operable to govern the rate of relative rotation of said shafts, and a control switch wired in an electrical circuit with the said motor to control the speed thereof, said switch including an element mounted for axial movement with said operating member and positioned to engage a fixed switch element of said circuit to operate said switch.

6. A lead screw unit for application to a machine tool or the like having a fixed base on which an operating member moves axially, said unit comprising a housing having adapter means to secure the same fixedly to an axial end of said base, said housing internally journaling shaft means including relatively rotatable shafts in coaxially threaded engagement with one another, said shafts extending externally of said housing and being provided with means to operatively connect the externally extending portion of one thereof to said operating member and to journal the other thereof on said base, whereby to cause axial movement of said operating member on said base upon relative threading rotation of said shafts, a common electric motor to drive said shafts mounted on said housing, and variable speed drive means within said housing connecting said device with said shafts and operable to govern the rate of relative rotation of said shafts, said drive means including a releasable clutch drivingly connected to one of said shafts and engageable to rotate the same during rotation of the other shaft, and a brake operatively connected to said one of said shafts to retard the same, and means to operate said clutch and brake in alternation, and a control switch wired in an electrical circuit with the said motor to control the speed thereof, said switch including an element mounted for axial movement with said operating member and positioned to engage a fixed switch element of said circuit to operate said switch.

References Cited in the file of this patent
UNITED STATES PATENTS

| | | |
|---|---|---|
| 2,375,422 | Leland | May 8, 1945 |
| 2,452,428 | Bryant | Oct. 26, 1948 |
| 2,476,376 | Laraque | July 19, 1949 |
| 2,777,339 | Hess | Jan. 15, 1957 |
| 2,791,922 | Robinson | May 14, 1957 |